(12) United States Patent
Sharma et al.

(10) Patent No.: US 11,461,313 B2
(45) Date of Patent: Oct. 4, 2022

(54) SYSTEMS AND METHODS FOR AUTOMATICALLY CREATING AND/OR MANAGING ELECTRONIC DATA TABLES

(71) Applicants: Atlassian Pty Ltd., Sydney (AU); Atlassian Inc., San Francisco, CA (US)

(72) Inventors: Yash Sharma, Sydney (AU); Austin Byrne, Sydney (AU); Perrin Alexander Stephenson, Sydney (AU); Itzchak Feldman Perka, Sydney (AU); James Benjamin McCullough, West Ryde (AU); Anushka Mudholkar, Sydney (AU); Tarunveer Singh, The Ponds (AU); Hideyoshi Cheong, Sydney (AU); Stephen David Lee, Sydney (AU)

(73) Assignees: ATLASSIAN PTY LTD., Sydney (AU); ATLASSIAN US, INC, San Francisco, CA (US)

( * ) Notice: Subject to any disclaimer, the term of this patent is extended or adjusted under 35 U.S.C. 154(b) by 0 days.

(21) Appl. No.: 17/037,608

(22) Filed: Sep. 29, 2020

(65) Prior Publication Data
US 2022/0100740 A1 Mar. 31, 2022

(51) Int. Cl.
*G06F 16/242* (2019.01)
*G06F 16/22* (2019.01)

(52) U.S. Cl.
CPC ........ *G06F 16/242* (2019.01); *G06F 16/2282* (2019.01)

(58) Field of Classification Search
CPC ...................................................... G06F 16/242
See application file for complete search history.

(56) References Cited

U.S. PATENT DOCUMENTS

| | | | |
|---|---|---|---|
| 2006/0047561 A1* | 3/2006 | Bolton .................. | G06F 21/577 705/7.28 |
| 2007/0136234 A1* | 6/2007 | Levin .................. | G06F 16/2462 |
| 2018/0089328 A1* | 3/2018 | Bath ..................... | G06F 3/0481 |
| 2018/0357381 A1* | 12/2018 | Aldin .................... | G16H 10/60 |

\* cited by examiner

*Primary Examiner* — Van H Oberly
(74) *Attorney, Agent, or Firm* — Brownstein Hyatt Farber Schreck, LLP (57) ABSTRACT

Systems and methods for automatically creating and managing electronic data tables are disclosed. The method includes receiving a metric request descriptor from a client device, the metric request descriptor including at least information for creating a metric query and an identifier of an electronic data table; automatically generating a custom metric query based on the information for creating the metric query and one or more predefined metric templates; creating the electronic data table based on the identifier of the electronic data table received in the metric request descriptor; applying the custom metric query to a data store storing a plurality of event records; extracting metric data from the data store based on the custom metric query; and storing the metric data in the electronic data table.

20 Claims, 6 Drawing Sheets

Metric Management System

| Filter metrics | All Metrics | All tiers | All labels | Filter keywords | Register Metric — 402 |

406 ─ 404

| Metric Name | Type | Tier | Owner | Labels | Search Keywords | Last updated |
|---|---|---|---|---|---|---|
| Opsgenie expands | Reporting | L2 | ⊙ | Analytics | Growth, cross sell | Just now |
| Instance expands | Reporting | L2 | ⊙ | Analytics | Growth, cross sell | 2 MIN AGO |
| Cloud Daily MAU | Reporting | L2 | ⊙ | Analytics | MAU, monthly active users | 6 MIN AGO |
| Cloud MAU deduped | Reporting | L0 | ⊙ | Finance | Monthly active users, deduped | 1 HR AGO |
| Long running tickets | Reporting | L3 | ⊙ | Product | Resolution time | 5 HR AGO |
| LRT % | Reporting | L3 | ⊙ | Product | LRT | 9 SEP 2020 |
| Routed to specialist | Reporting | L3 | ⊙ | CSS | Specialized | 8 SEP 2020 |
| DE rate | Reporting | L3 | ⊙ | CSS | De_rate | 29 AUG 2020 |

SYSTEMS AND METHODS FOR AUTOMATICALLY CREATING AND/OR MANAGING ELECTRONIC DATA TABLES

TECHNICAL FIELD

Aspects of the present disclosure are directed to data integration and in particular to systems and methods for automatically creating and managing electronic data tables.

BACKGROUND

Background information described in this specification is background information known to the inventors. Reference to this information as background information is not an acknowledgment or suggestion that this background information is prior art or is common general knowledge to a person of ordinary skill in the art.

Computer application developers often create metrics or experiments to track product performance (e.g., whether a new software feature is liked by customers, how many times an attachment to a message is opened, how many active users have interacted with a software product in a month, etc.). The performance of these metrics may help drive future developments, and/or help the team track current software deployments. At the most basic level, a metric is a system or standard measurement.

Typically, these data metrics and/or experiments are created using complex database queries, which extract relevant data from event logs and transform the extracted data for further analysis. Further, there is usually no central location to manage or view the already created metrics. Because of this, developers may create duplicate metrics, which initiate duplicate scheduled data extractions and data transformation, unnecessarily wasting precious network and storage resources.

SUMMARY

Example embodiments described herein are directed to a computer implemented method. The computer-implemented method includes receiving a metric request descriptor from a client device, the metric request descriptor including at least information for creating a metric query and an identifier of an electronic table. The method further includes automatically generating a custom metric query based on the information for creating the metric query and one or more predefined metric templates and creating an electronic data table based on the identifier of the electronic table received in the metric request descriptor. In addition, the method includes applying the custom metric query to a data store storing a plurality of event records, extracting metric data from the data store based on the custom metric query, and storing the metric data in the electronic data table.

Some example embodiments are directed to a computer system. The computer system includes a processor and non-transitory computer readable medium storing sequences of instructions. When the instructions are executed by the processor, they causes the processor to: receive a metric request descriptor from a client device, the metric request descriptor including at least information for creating a metric query and an identifier of an electronic table. In addition, the instructions cause the processor to automatically generate a custom metric query based on the information for creating the metric query and one or more predefined metric templates and create an electronic data table based on the identifier of the electronic table received in the metric request descriptor. Further, the instructions cause the processor to apply the custom metric query to a data store storing a plurality of event records, extract metric data from the data store based on the custom metric query, and store the metric data in the electronic data table.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described previously, software developers often perform experiments to analyse software application usage data and/or application performance data to determine the success/failure of launched features, track application usage, and/or identify new improvements to the software. These experiments typically track an underling metric—i.e., a system or standard measurement. For example, one experiment may track the number of times an attachment is opened. Another experiment may track the number of active users that interact with a software application in a month, and other experiments may track the number of times a newly introduced product feature is used.

Some experiments may be long term (e.g., such as those used to track usage over time), which may be scheduled to extract data from event logs periodically whereas other experiments may be shorter term (e.g., such as those used to measure usage over a fixed period in the past), which may extract data at one time, or periodically for a short period of time. In any event, for any particular experiment, a metric (that needs to be measured) is determined, event data that can be used to measure the metric is determined, and then developers typically write a complex query to retrieve relevant event data from a database that stores various types of event logs, create scheduled jobs to run the queries at predetermined scheduled times, and store the retrieved data in another database or electronic data table.

Because of this complexity in creating and maintaining experiment metrics, data analysis and integration is typically performed by savvy software developers.

Aspects of the present disclosure provide a central metric management system that can be used to automatically create, store and search for metrics. In particular, the metric management system automatically creates electronic data tables for storing metrics, schedules jobs, extracts data from underlying event logs, and populates the electronic data table with the extracted data. This electronic data table can then be communicatively coupled to a dashboard such that the extracted data can be represented to a user in an intelligent manner In addition, the metric management system provides a central searchable database for the created metrics. Developers can search existing metrics to determine if they need to create a new metric or may simply be able to use extracted data from an existing metric for their own purposes. This prevents any duplication of scheduled data extraction jobs and thereby reduces network and storage usage and database queries.

These and other aspects of the metric management system will be described in detail with reference to FIGS. 1-6.

Figure 1:
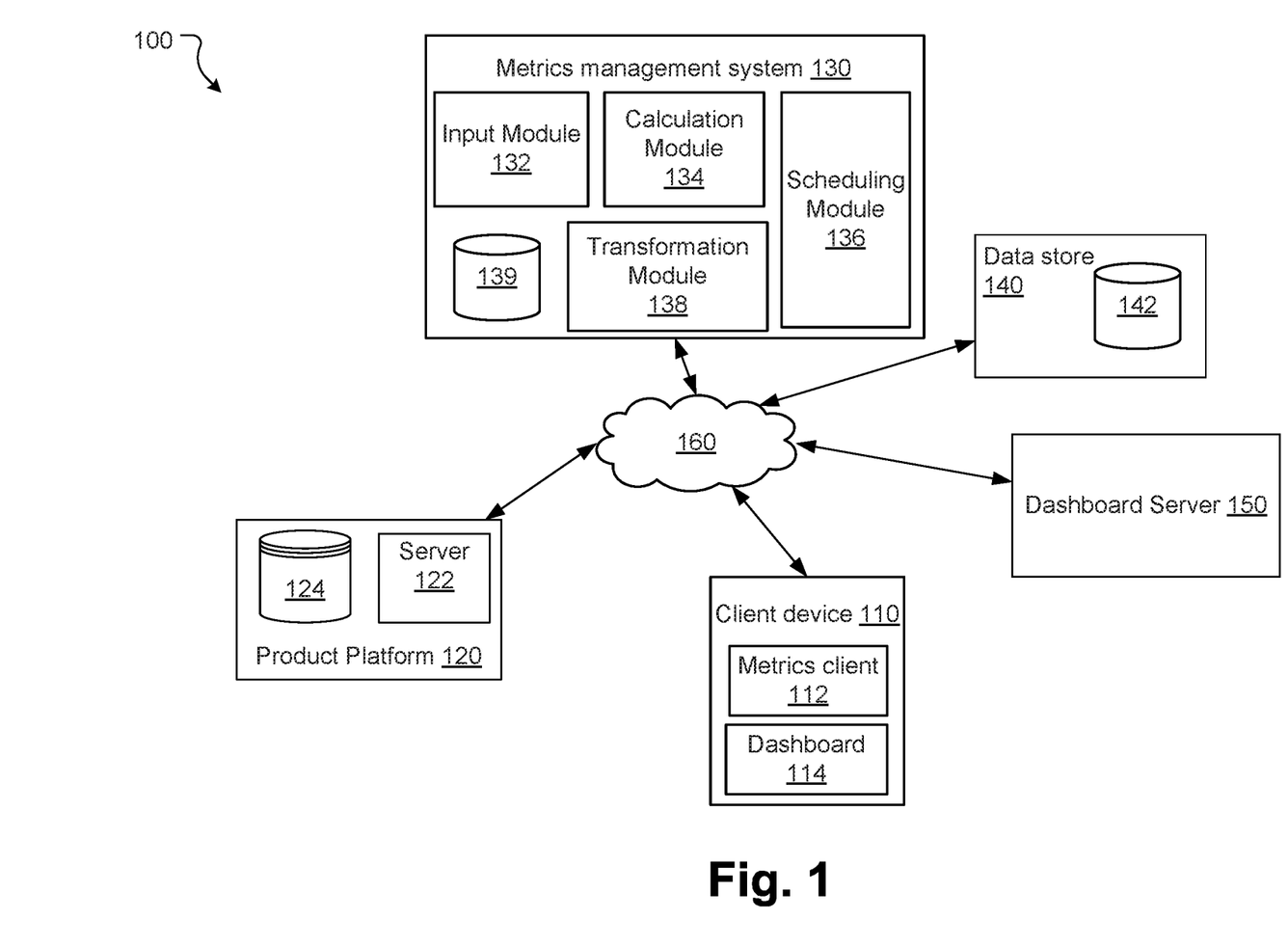
FIG. 1 is a diagram depicting a networked environment in which various features of the present disclosure may be implemented.

FIG. 1 illustrates an environment 100 in which one or more aspects of the present disclosure are implemented. Specifically, FIG. 1 illustrates the systems involved in creating, maintaining, and using data experiments/metrics. The systems include a client device 110, product platforms 120, a metric management system (MMS) 130, a data store 140, and a dashboard server 150. The client device 110, product platform 120, MMS 130, data store 140, and dashboard server 150 communicate with each other over one or more communication networks 160.

The client device 110 may be any suitable device, for example a mobile device (e.g. a tablet or mobile phone), a portable device (such as laptop computer), or any other computing device (e.g. a desktop computer).

As illustrated in FIG. 1, the client device 110 includes one or more client (software) applications (e.g., metrics client 112) that are configured to allow users to create and manage metrics in collaboration with the MMS 130. The metric client 112 includes instructions and data stored in the memory (e.g. non-transitory computer readable media) of the client device 110 on which the application is installed/run. These instructions are executed by a processor of the client device 110 to perform various functions as described herein. By way of example, some functions performed by the metric client 112 include communicating with the MMS 130, rendering user interfaces to receive metric requests from users, rendering user interfaces to display one or more created metrics, etc.

In addition to the metrics client 112, the client device 110 may further include one or more dashboard clients 114 configured to access metrics dashboards made available by the dashboard server 150. In this case, the dashboard client 114 may communicate with an application hosted by the dashboard server 150, render user interfaces based on instructions received from that application, and receive inputs from user accounts allowing them to interact with metric content hosted by the dashboard server 150.

The client devices also include one or more product clients (not shown) configured to access software applications made available by the product platform 120. In this case, the product client may communicate with applications hosted by the product platform 120, render user interfaces based on instructions received from those applications, and receive inputs from user accounts allowing them to interact with the applications hosted by the product platform 120.

The metric client 112, dashboard client 114, and/or product client may be implemented in various ways. For example, the clients may be web browser applications, which access the applications hosted by the product platform 120, MMS 130, and/or dashboard server 150 via appropriate uniform resource locators (URL) and communicate with these systems via general world-wide-web protocols. In this case, the web browser application is configured to request, render, and display user interfaces that conform to a markup language such as HTML (Hypertext Mark-up Language), XML (Extensible Markup Language) or extensions, and may be capable of internally executing browser-executable code, or other forms of code. Alternatively, the clients may be specific applications programmed to communicate with the MMS 130 and dashboard server 150 using defined application programming interface (API) calls.

In general, a product platform 120 is a system entity that hosts one or more software applications and/or content. The product platform 120 may include one or more servers 122 for hosting corresponding software application(s) and one or more databases 124 for storing application specific data. Examples of software applications hosted by the product platform 120 include collaborative applications (e.g., Confluence®), software code management applications (e.g., Bitbucket®), and issue tracking applications (e.g., JIRA®). Jira®, Confluence®, and BitBucket® are all offered by Atlassian, Inc. It will be appreciated that the software applications need not be offered by the same organization and that the presently disclosed embodiments can be used with any product platform 120.

In order to run a particular application, the server 122 includes one or more application programs, libraries, APIs, or other software elements that implement the features and functions of the application. The product platform 120 also stores product data. Product data generally includes: data defining the operation of the hosted application (for example, user accounts, user permissions, and the like); and application data (i.e., the content hosted/maintained by the application, which can be, for example, issue data (in an issue tracking system), page/document data (in a collaborative content management system), or source code data (in a source code management system), etc.). The data is stored on and managed by product database 124. Product database 124 is provided by a database server which may be hosted by server 122, but is more typically hosted on a separate physical computer in communication (directly or indirectly via one or more networks) with the server 122.

While single server architecture has been described herein, it will be appreciated that the product platform 120 can be implemented using alternative architectures. For example, in certain cases a clustered architecture may be used where multiple server computing instances (or nodes) are instantiated to meet system demand Conversely, in the case of small enterprises with relatively simple requirements a product platform 120 may be a stand-alone implementation (i.e., a single computer directly accessed/used by the end user).

In general, the MMS 130 is configured to create and register metrics, create electronic data tables for storing metric data, and manage metrics. To that end, the MMS 130 includes an input module 132 configured to receive metric requests from one or more metric clients 112, a calculation module 134 configured to create queries for extracting data from the data store 140 (based on the received metric requests), a scheduling module 136 configured to schedule extraction of relevant data from the data store, and a transformation module 138 to transform the extracted data into a suitable format and store in an electronic data table in the data store 140.

In addition, the MMS 130 includes a metrics database 139 configured to store registered metrics. As referred to in this disclosure, a metric is define to include one or more artefacts, including a definition for calculating the measurement, metadata (e.g., name, ownership, change history, tiering, tags and categories, etc.), and assurance (e.g., data quality checks, change controls, etc.). In one example, the registered metrics may be stored in any appropriate data structure (or set of related data structures). By way of example, the registered metrics may be stored in a table as shown in table A below—

TABLE A example metric data structure

| Metric ID | Metric name | Description | Tier | Label | Last updated | Owner | Metadata |
|---|---|---|---|---|---|---|---|
| 01 | % routed to specialist engineers | Metric to calculate the percentage of issues that are escalated | L3 | Customer support | 9 Sep. 2010 12:34 PM | John Doe | Routed to specialized |
| 02 | Cloud Monthly active users | Metric to determine number of active users in the cloud each month | L0 | Product analytics | 9 Sep. 2010 12:35 PM | Jane Deer | MAU active users, deduped |
| 03 | Overall issue resolution time | Metric to calculate average time taken to resolve issues | L3 | Customer support | 9 Sep. 2010 12:36 PM | John Doe | Resolution time |
| 04 | Work hours logged | Metric to calculate average number of work hours logged per week | L3 | Customer support | 9 Sep. 2010 12:37 PM | Analytic team | WHL |

For each record, this table stores:

A metric ID uniquely identifying the metric. This ID is generated by the MMS 130 once a metric is registered.

Metric name: a suggestive title for the metric provided by the creating user.

Description: a definition for calculating the metric. This can be a written description including formulas for calculating the metric or a technical description, e.g., an SQL query or YAML file for extracting relevant data from the data store for implementing the metric.

Tier: a tier for the metric. This is used for ranking metrics based on importance of the metric. In the example shown in table A, a metric can have a value between L0-L3. L0 being a business critical metric used for reporting externally and internally. L1 being an internally critical metric, L2 being a metric used by multiple internal teams, and L3 being a metric used by an individual or a single team.

Label: indicating a broad category in which the metric falls. Labels can be predefined based on the implementation. For example, labels can be predefined based on the different functions within an organization, based on different software applications being monitored, etc.

Last updated: indicating when the metric was last updated. This field can be used to determine whether the metric is currently in use. The MMS 130 can be configured to notify owners of outdated metrics. Owners can then consider deleting the metric if it is no longer required, updating it, or taking any other appropriate action. In other examples, the MMS 130 may automatically delete outdated metrics. For example, it may be configured to delete any metrics that haven't been updated in the last two years.

Metadata: this field includes keywords associated with the metric. The keywords may be generated by the MMS 130 based on the other metric related information provided by users, e.g., the metric name, description, and label.

Owner: indicates the user or team that created the metric.

It will be appreciated that these are only some optional metric fields that may be stored in the metric database. Other fields can just as easily be stored and maintain. For example, for each record, the corresponding electronic data table, creation date, query to extract data, query to retrieve data from the electronic data table, etc. may also be stored.

Generally speaking, users of product clients are associated with user accounts and generate electronic activity. This activity includes any type of user account interaction with the one or more software applications hosted by the one or more product platforms 120. Example interactions include exchanging emails and/or documents, editing content, commenting on content, visiting web pages, sharing, liking, or viewing content, communicating with other user accounts in a real-time chat interface, etc.

In one example, the environment 100 may further include an event platform (not shown) which monitors these user account interactions with software applications hosted by the product platforms 120 and records the user account interactions as event logs. Typically, events happen to one or more elements, objects, or containers within a software application. An element may be a selectable affordance or the like. An object is the fundamental unit of a software application. For issue tracking systems, it is an issue and for collaborative content management systems, it is a wild page. Containers hold objects. For issue tracking systems, a container is a project (which includes multiple issues) and for a wiki management system, the container may be a space (which includes multiple wild pages).

In some examples, the event platform may be configured to store the event logs in the data store 140. Further, the event platform may receive all types of user account interactions (including e.g., selection of features or time spent on a particular webpage). In other cases, the event platform may register for certain types of events and not other types of user interaction events. In any case, the event data received at the event platform is stored in the data store 140 in a structured and searchable manner.

In some examples, the event platform may be designed based on a publish-subscribe model. That is, product platforms 120 send event data to the event platform and consumers (such as the data store 140) subscribe to the event platform to receive certain type of event data from the event platform. In this model, the publishers categorize the event data into classes without knowledge of which subscribers there may be. Similarly, subscribers express interest in one or more classes of event data and receive event data from the event platform that is of interest to them. When the event platform receives an event log, the event platform matches the event log with the subscribers who are subscribed to the event and makes a copy of the event data for each subscriber and stores a copy of the subscriber's queue or stream. In this case, the product platform 120 may submit event data to the event platform and the data store 140 may subscribe to the event platform to receive data events related to any user account interaction with applications running on the product platform 120. StreamHub® offered by Atlassian, Inc. is one example of such an event platform.

As described above, the data store 140 receives event logs from the event platform and stores this information. In addition the data store 140 may receive event logs directly from other databases or systems (such as Splunk) and/or directly from the product platforms 120 via webhooks. The data may be stored and persisted in cloud storage (e.g., Amazon Web Services Simple Storage Service, AWS S3) and accessible via queries (such as SQL queries). In addition to storing data from the event platform, the data store 140 may also include electronic data tables 142 for storing metrics data corresponding to metrics created by the MMS 130. In certain examples, when the MMS 130 creates a new metric, it creates an electronic table 142 within the data store 140 for storing the extracted metric data.

In certain embodiments, the data store 140 stores four main types of events—screen events, user interface events, track events, and operational events. For each of these event types the action (i.e., what generated the event) and the context (where the event was generated) is stored. Each of these event types are described below.

Screen events are analytics events that fire when a user navigates to a particular screen, tab, drawer, modal, or inline-dialog. These events enable analysis of the navigation paths taken by users to perform specific tasks. Screen events typically include the action (e.g., viewed) and the screen ID (e.g., createIssueScreen).

User interface events are analytics events that fire when a user interacts with a user interface element such as a button, text field, or link. These events enable analysis of the fashion in which users perform certain tasks. User interface events include the following action information: action (what the user did, e.g., clicked), the element that was actions (e.g., a button), and an identifier of the element that was actioned, if required (e.g., "createIssueButton"). In addition, screen events include the following context information: source (name of the screen the element was on, e.g., "viewIssueScreen"), the object identifier of the object in which the action was performed, and the container identifier of the container associated with the object.

Track events are analytics events that fire when an actor successfully completes a product action such as creating an issue in an issue tracking system or viewing a wiki page. These types of events indicate an action that has occurred, not the intention to take an action. For example, a user clicking on a comment box is considered a UI event, but once the comment has been saved and created, this is considered a track event. Three different actors can trigger track events: users—performing actions in software applications hosted by the product platforms, software applications—internally, usually on behalf of users, e.g. an internal job creating issues from emails or a bulk import, or add-ons and bots—calling APIs of the software applications hosted by the product platforms 120. Track events are often fired for objects, containers, and elements. An object is the fundamental unit of a product. For an issue tracking system, it is an issue. For a wiki management system, an object is a wiki page. A container holds objects. For an issue tracking system, it is a project (that includes multiple issues). For a wiki management system, a container is a space (including multiple pages). Further, track events can be fired from the client and the server. Server-side (back end) track events provide a way to capture interactions from all the actors and client-side (front end) track events provide more contextual (source, product platform, etc.) information.

Track events include the following action information: action (what action was taken, e.g. "created"), the entity/element involved in the action, e.g. "comment", and the identifier of the entity/element if it is not an object or container event, e.g., "30". The context information included as part of track events is the source (this is dependent on who triggered the event, the object type and identifier if the action was performed in or on an object and container type and container identifier if the action was performed in or on a container.

Operational events are analytics events that are used to measure usages or performance of implementation detail. These events are not used to measure user actions, but rather help determine whether a software application functionality is correctly operating. For example, an operational event can fire when a user triggers an internal UI component event such as its initialisation. This would enable developers to track performance and usage frequency of the UI component and help determine loading patterns that need to be updated (e.g. lazy loading). Another example of where operational events are useful is for background tasks which users do not necessarily interact with but are operational. Firing an event every time this task is run provides visibility over its usage and performance.

The dashboard server 150 is configured to consume metric data from the electronic data tables and generate one or more dashboards based on the metric data to be rendered by a dashboard client 114. To this end, the dashboard server 150 is communicatively coupled to the data store 140 and in particular to the electronic data tables 142. When a client device 110 requests a dashboard corresponding to a particular metric be to displayed, the dashboard server 150 retrieves the underlying data from a corresponding electronic data table 142, generates a dashboard including suitable visualisations (e.g., charts, graphs, alerts, etc.) and forwards the generated dashboard to the requesting dashboard client 114 to be displayed on the client device 110.

Further still, in some embodiments, the environment 100 may further include an identity platform (not shown). Typically, in organizations, unique user identifiers identify employees. These might be the same as the user identifiers used to access the product platform, the MMS 130, and the dashboard server 150 or may be different. An identity platform manages and links the various user identifiers used by the different product platforms 120 in the network to the user identifiers used by the organization. This way identity can be federated across the environment 100. Further, the identity platform may maintain personal user information for employees that is shared with the various product platforms 120—e.g., the user name, position, organization division, years employed by the organization, date of birth, etc. The MMS 130, data store 140, and/or dashboard server 150 may query the identity platform from time to time to retrieve personal user information for user identifiers.

As illustrated in FIG. 1, communications between the client devices 110, product platforms 120, MMS 130, data store 140, and dashboard server 150 are via the communications network 160. For example, the client devices 110 may communicate with the product platforms 120, the MMS 130 and/or the dashboard server 150 through a local area network (LAN) or a public network (e.g., the Internet). Furthermore, the MMS 130 and/or dashboard server 150 may communicate with the data store 140 over open web protocols such as (HTTPS, REST, and JWT).

It will be appreciated that although one client device 110 and one product platform 120 has been illustrated in FIG. 1, in normal operation, many more client devices 110 and product platforms 120 may be communicatively connected to the MMS 130. Further, although the MMS 130 and data store 140 are shown as separate entities to the product platform 120, in some implementations the MMS 130 one or more of these may form part of the product platform 120 or be hosted by the same server.

One or more special-purpose computing systems or devices implement the operations/techniques described herein. For example, in environment 100: the product platforms 120, the MMS 130, the data store 140, and dashboard server 150 may be provided by one or more computer systems; and each client device 110 is a computer system.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired, and/or program logic to implement relevant operations.

Figure 2:
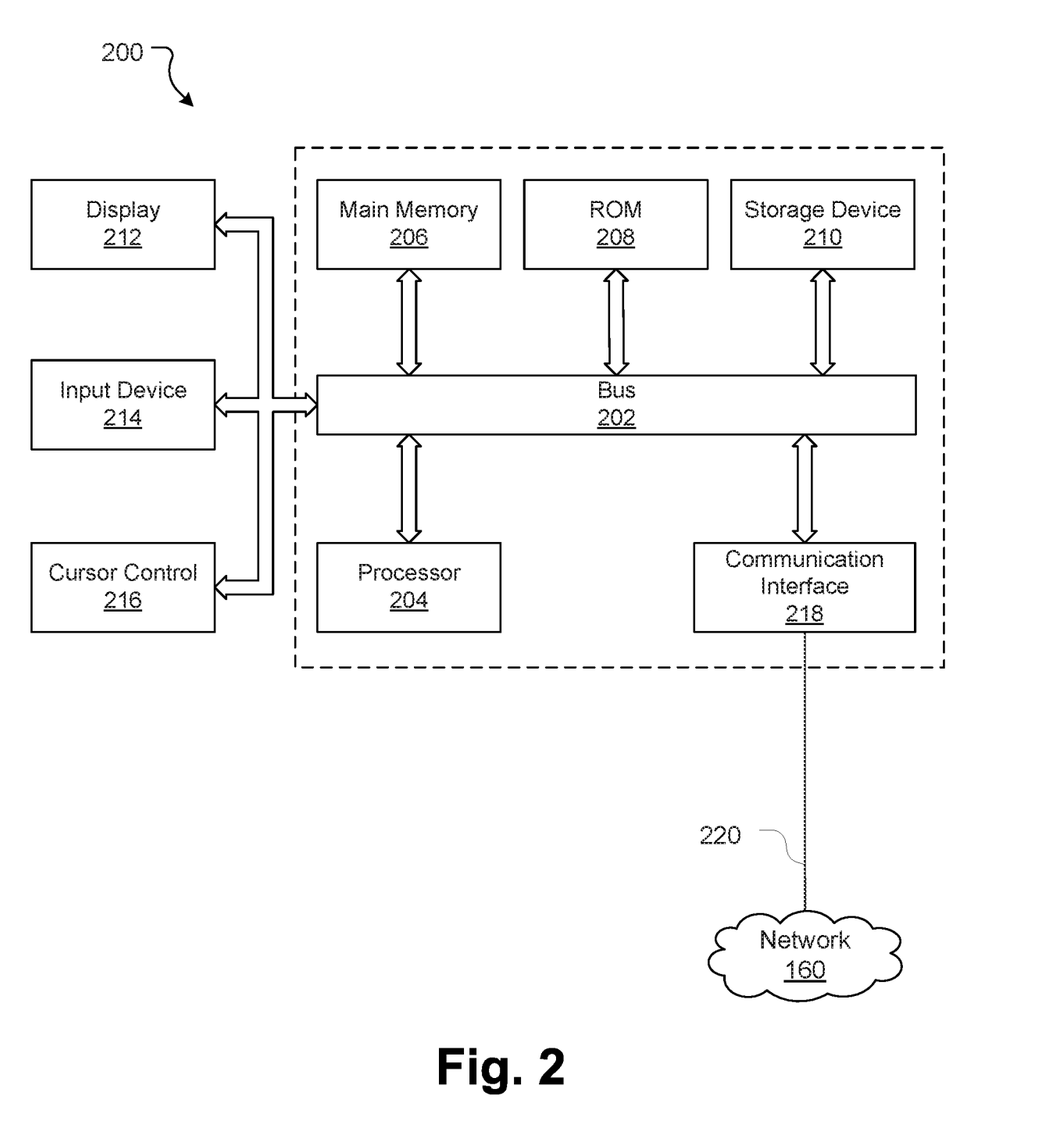
FIG. 2 is a block diagram of a computer processing system configurable to perform various features of the present disclosure.

For example, FIG. 2 is a block diagram that illustrates a computer system 200 upon which an embodiment of the present disclosure may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory computer readable media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. If the computer system 200 is part of the MMS 130, the storage device 210 may store metric database 139.

In case the computer system 200 is the client device 110, it may be coupled via bus 202 to one or more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example, touch screen displays.

According to one embodiment, the methods disclosed herein are performed by computer system 200 in response to processor 204 executing one or more sequences of one or more instructions contained in a non-transitory computer readable medium such as the main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory computer readable media that store data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, any other memory chip, or cartridge.

Storage media is distinct from but may be used in conjunction with transmission media. Transmission media participates in transferring information between storage media. For example, transmission media includes coaxial cables, copper wire, and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to network 160. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

Network link 220 typically provides data communication through one or more networks 140 to other computing systems. For example, if the computer system 200 is part of the MMS 130, the network link 220 may provide a connection through network 160 to client device 110 or data store 140.

Computer system 200 can send messages and receive data, including program code, through the network(s), network link 220, and communication interface 218. In the MMS example, the input module 132 may receive metrics requests through the network 160 and communication interface 218 from the client device 110 and may send metric queries to the data store 140 via the network 160 and communication interface 218.

The following section describes a computer implemented method for creating a metric and in particular for automatically creating and managing an electronic data table with metric data according to some aspects of the present disclosure.

Figure 3:
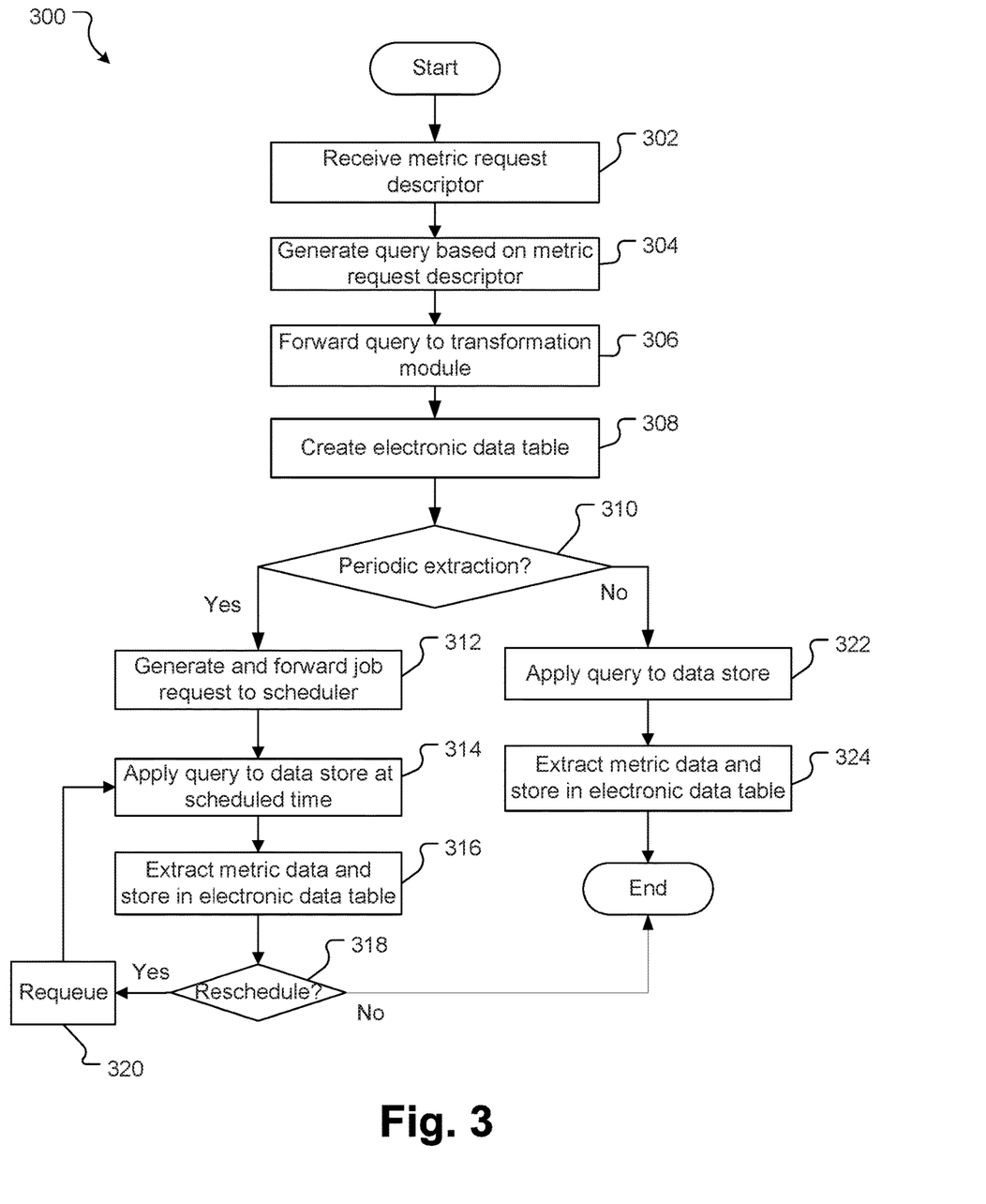
FIG. 3 is a flowchart illustrating an example method for creating an electronic data table according to some aspects of the present disclosure.

The method 300 will be described with reference to the flowchart of FIG. 3 which illustrates processing performed by the MMS 130. In certain embodiments, specific modules running on the MMS 130 (e.g., input module 132, calculation module 134, scheduling module 136, or transformation module 138 as described previously) perform these processing steps. In alternative embodiments the processing described may be performed by one or more alternative systems (operating in conjunction with the MMS 130 or independently) and/or alternative applications/modules running on those systems.

When a user (e.g., a developer) wishes to create a new metric, the user accesses the metric client 112 on the client device 110. In certain examples, the metric client 112 displays a landing page/home page user interface for the particular user. The landing page/home page may show a list of recent metrics the user has permission to view/access, one or more metrics previously created by the user, a search interface to search for metrics, and/or a selectable affordance for creating a new metric.

Figure 4:
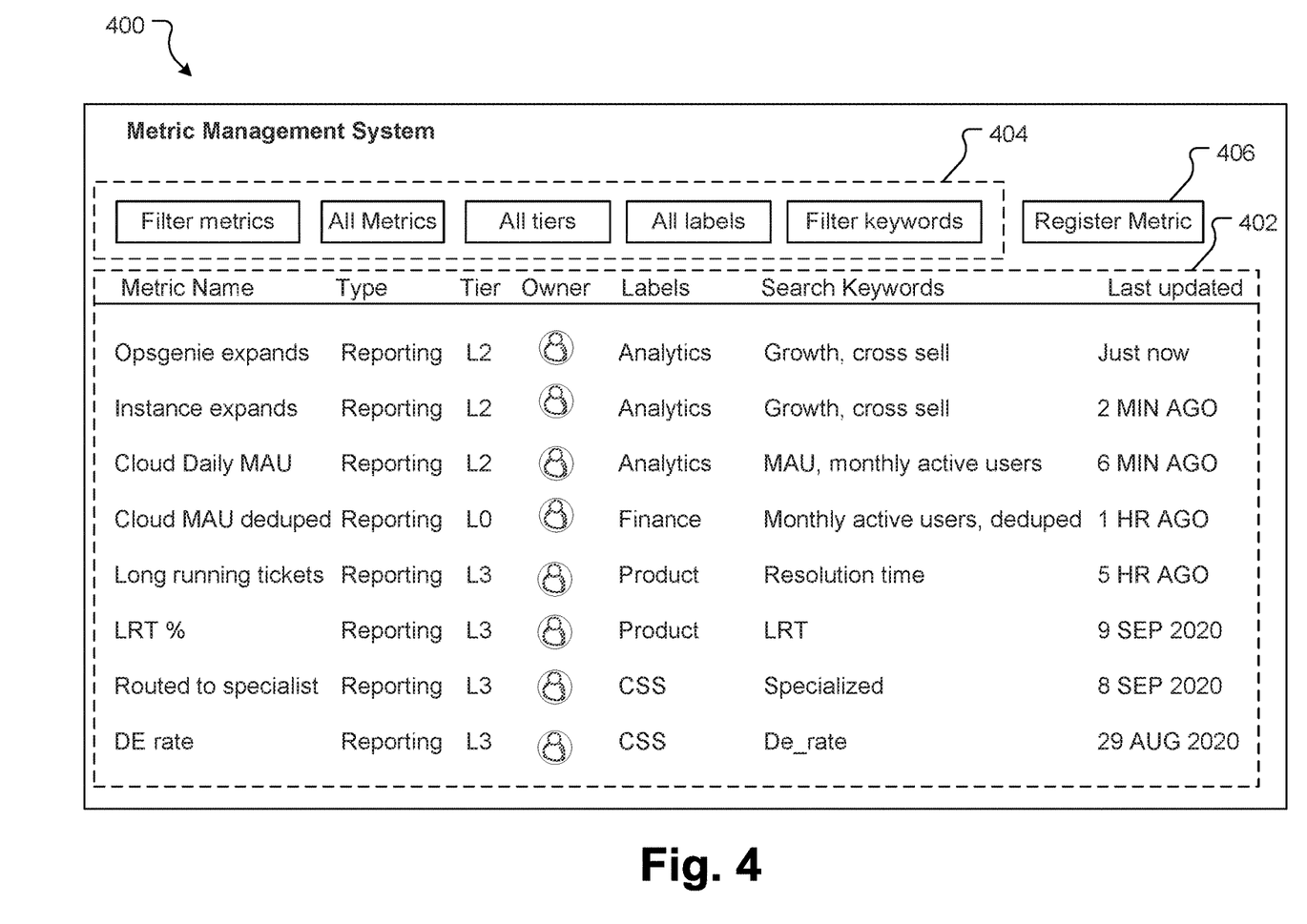
FIG. 4 is an example user interface showing a landing page of the metric management system according to some aspects of the present disclosure.

FIG. 4 shows an example user interface 400 displayed to the user when the user accesses the metric client 112. As shown in this user interface, the client 112 displays a list of metrics 402 that the user has permission to view. Some metadata about each metric is displayed. For example, for each displayed metric, the client 112 shows a metric name, a metric acronym (if available), a metric tier (in this example ranging from L0, critical to organization, to L3, pertinent to a single user or team), metric owner (in this example either a user or a team), label, search keyword, and when the metric was last updated.

In addition, the user interface 400 provides a mechanism 404 to further filter the displayed metrics. For example, the user can filter the displayed metrics based on keywords, tiers, labels, update date, etc. The user interface 400 also includes a selectable affordance 406 to create a new metric.

When the user selects the affordance 406, the metric client 112 may display another user interface to retrieve user input for creating a new metric.

Figure 5:
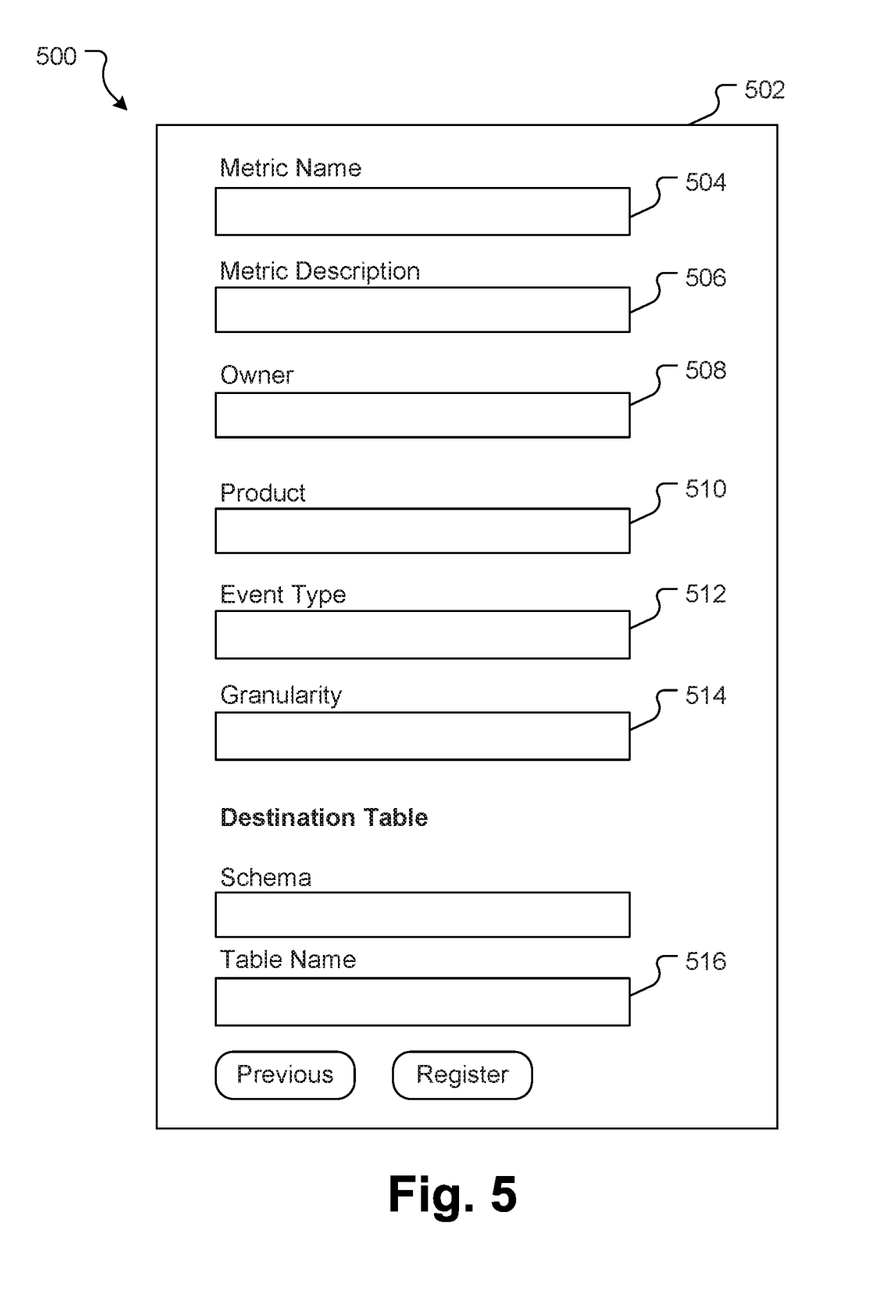
FIG. 5 is an example user interface showing an input form for creating a new metric according to aspects of the present disclosure.

FIG. 5 illustrates an example user interface 500 displayed to the user when the user selects the selectable affordance 406 of FIG. 4. As seen in FIG. 5, the user interface 500 displays an input form 502 to collect metric information from the user. In certain embodiments, the user creating the metric may be requested to provide the following information about the metric—a metric name 504 and a metric description 506. In addition, the MMS client 112 automatically identifies the user requesting the metric creation (e.g., in collaboration with the identity platform) and automatically selects the identifier user as the metric owner 508. In some examples, the user may be able to select one or his/her team as the metric owner. To this end, the client 112 may communicate with the identity platform to retrieve a list of teams the user is a member of. These team names may be displayed in a drop-down menu and the user may select any one of the displayed teams as the metric owner. This information is utilized to register the metric at the MMS 130 so that other users can search the metric in the future.

In addition, information utilized by the MMS 130 to generate a data store query is requested in the user form 502. This information includes selection of a product platform (see input form field 510) that generates the events that need to be monitored. For example, if the metric is meant to measure the number of open issues in an issue tracking system, the corresponding issue tracking system product platform may be selected. Similarly, if the metric is meant to measure the number of code repositories with pull requests a corresponding source code management product platform may be selected and if the metric is meant to track the number of times user make comments in a wiki page, the corresponding collaboration content management product platform may be selected.

Moreover, the user is requested to input one or more event types to be extracted (see input form field 512). In some examples, based on the product platform selected in input field 510, the MMS 130 may generate a list of event types that can be selected. For example, if the selected product platform is an issue tracking system, the types of events may include issue status change, issue selection, etc. In another example, a more generic list of event types may be listed in input form field 512 for the user to select. These may include, for example, screen events, track events, user interface events, and operational events.

Additionally, the user may be requested to input a granularity for the metrics (see input form field 514). A metric may be used to track on a user level granularity (e.g., number of issues created per user per day) or on a tenant level granularity (e.g., number of issues created per tenant per day). Although not depicted in input form 502, in some cases, the user may also be requested to input one or more events that the user wishes to monitor. For example, if the user has selected UI event type in field 512, the user may be presented with a number of UI events maintained by the data store 140 for the selected product platform and selected granularity. The user may select one or more of the presented UI events.

The input form 502 may also be used to collect information about the electronic data table name in which the user wishes to store the extracted metric data (see input form field 516). If the table name is provided, the MMS 130 requests the data store 140 to create an electronic data table with the provided name. Alternatively, if no name is provided, the MMS 130 may be configured to assign a default table name and add this table name to the registered metric stored in the MMS metric database 139.

The metric may be configured such that data is extracted once or on a periodic basis. Further, the user may be able to provide a period (e.g., a start date and/or an end date) for which metric data is needed. Although fields corresponding to the periodicity and duration are not shown in input form 502, these can also be provided in the form in some examples.

Once the information is received in the input form from the user, the metric client generates a metric request and forwards the metric request to the MMS 130. In one example, in addition to the data provided as part of the input form, the metric client 112 may further include a metric client identifier and a user identifier of the user operating on the metric client 112. The metric request is forwarded to the MMS 130 in the form of a metric request descriptor. Table B illustrates an example metric request descriptor. Although a table is illustrated to show this information, it will be understood that the information need not be communicated in a table. Instead, it may be communicated in a suitable file such as a JavaScript Object Notation (JSON) file or a YAML file.

TABLE B

Example metric request descriptor

{
"metric_name": "string",
"metric_description": "string",
"owner": "zone_ape",
"created_by": "string",
"destination_schema": "string",
"destination_table": "string",
"template_name": "event_screen",
"template_granularity": "user",
"filters": [
{
"column": "name",
"value": "viewed example"
},
{
"column": "product",
"value": "ITS1725"
}
]
}

Method 300 begins at step 302, where the MMS 130 (and in particular the input module 132) receives the metric request descriptor from a metric client 112. As described previously, the metric request includes data defining the metric (e.g., metric_name, metric_description, owner, created_by, etc. in table B), data for calculating the query (e.g., template_name, template_granularity, filters, etc. shown in table B), and data for creating an electronic data table/scheduling tasks (e.g., destination_schema and destination_table shown in table B). The MMS 130 unpacks the metric request descriptor and utilizes the data defining the metric (e.g., the metric name and description and owner information) to create a new metric record in the metric database 139. In some examples, it may automatically include other information, including the metric ID, the tier, label, and metric metadata. Further, the last updated date and creation date may be updated to be the date/time at which the metric request was received at the MMS 130.

Next (at step 304), the input module 132 communicates data for calculating the metric along with the metric ID to the calculation module 134. The calculation module 134 utilizes the product platform identifier, the event type identifier and the granularity provided as part of the data for calculating the metric to generate a query for extracting metric data from the data store 140. In some examples, the calculation module 134 may include one or more pre-defined query templates for different types of product platforms, event types, and granularity. At step 304, the calculation module 134 dynamically creates a custom query based on the query parameters received from the input module 132 and the pre-define query templates. In one example, the query is an SQL query.

Table C illustrates an example SQL query generated by the MMS 130 for the following input data—
Product platform ID: ad2346df
Event type: event screen
Operating system: Windows
Web Browser: Google Chrome
Granularity: User

TABLE C

Example SQL Query

SELECT
cast(current_timestamp as string) as timestamp,
day AS day,
userid AS dim_userid,
useridtype AS dim_useridtype,
COUNT(*) AS metric_event_count
FROM cloud.event_screen
WHERE
product = ITS2786
AND name = 'viewed backlog'
AND os = 'windows'
AND browser = 'chrome'
AND day = '{{%Y-%m-%d}}'
GROUP BY
day, userid, useridtype At step 306, the generated query is forwarded to the transformation module 138. The transformation module 138 is configured to perform a number of functions including—determining whether the metric requires a single data extraction or periodic data extraction, creating a new electronic data table in the data store 140, and requesting the scheduling module 136 to create a new scheduled job for the metric in case periodic data extraction is required.

At step 308, the transformation module 138 requests the data store 140 to create an electronic data table for the metric. To this end, the transformation module 138 forwards the table name received as part of the metric request along with the metric identifier and any other information required to create the electronic data table. Once the data store 140 creates the electronic data table 142 the data store 140 sends a confirmation message back to the transformation module 138 indicating that the electronic data table 142 has been created. In case the data store 140 has been unable to create the corresponding electronic data table 142, it communicates an error message to the transformation module 138, which fails the metric creation. In such cases, the MMS 130 transmits a message back to the metric client 112 to display on the client device 110. The error message may inform the user that the request has failed and may provide a reason for the failure (e.g., incorrect or already used table name).

Next, at step 310, the transformation module 138 determines whether the metric requires a single data extraction or periodic update. In certain embodiments, this determination can be made based on the received metric request. The metric request may include a scheduling field (e.g., a flag for scheduled extraction). If the flag value is 0, the transformation module 138 can determine that scheduling is not required. Alternatively, if the flag value is 1, the transformation module 138 determines that scheduling is required.

In some cases, the metric request may also include the periodicity for metric extraction (e.g., every hour, daily, weekly, etc.). In addition, an end date or time may also be provided as part of the metric request descriptor. For example, if the metric is created to retrieve data daily for one year, the end date may be set as one year from the creation date. Alternatively, an explicit end date may be provided as part of the metric request descriptor. In some embodiments, the user may be requested to input the periodicity and/or the end date. In other embodiments, the metric client 112 or the MMS 130 may set a default periodicity (e.g., daily) and/or end date (e.g., one year) if this is not provided. In other cases, no end date may be set either by the user or the systems. In such cases, the MMS 130 may continue to extract data from the data store 140 indefinitely or until an end date is provided and/or the metric is deleted.

If at step 310, it is determined that the metric requires periodic update, the method proceeds to step 312 where the transformation module 138 creates a job request. The job request may be created based on the generated query and metric request. Largely the job request includes an identifier that uniquely identifies the current job, and a field indicating the scheduling frequency. The job request further includes the metric identifier, a field indicating the query to extract data from the data store 140, and an identifier of the electronic data table 142 created in the previous step in which the extracted data is to be stored. The job request may also include a refresh identifier. The refresh identifier indicates whether the electronic data table is to be completely refreshed each time the job is executed (e.g., in cases where the table is created to maintain data for a moving time window) or whether the extracted data is to be appended to the electronic data table without deleting the existing data (e.g., in cases where the table is created to collect data over a longer period of time). If no such refresh identifier is provided, by default, the transformation module 138 may select the option to incrementally append the last day's data to the table.

The job request may be in the form of a job descriptor. Table C illustrates an example job descriptor below. Although a table has been used to illustrate information stored in the job descriptor, the relevant information need not be stored in a table and could be stored in any appropriate format (e.g. a simple text file, a JSON file, an XML file, etc.).

TABLE C

| Job Descriptor | |
| --- | --- |
| Job descriptor ID | 8374erjewlkfjdslk3874 |
| Frequency | Daily |
| Metric ID | 347kdsfjh38764 |
| SQL Query | . . . |

TABLE C-continued

| Job Descriptor | |
| --- | --- |
| Data table name: | Resolution metric data |
| Refresh type | Period incremental |

In some examples, the job descriptor may also include an end date. This job descriptor is then forwarded to the job scheduler 136 which determines that the received job descriptor is for a periodical job, adds a scheduled time for the job, and stores the job descriptor until the scheduled time.

At the scheduled time, the job scheduler 136 retrieves the scheduled job descriptor and executes the query included as part of the job descriptor on the data store 140 (at step 316).

The job scheduler then determines whether the job request needs to be rescheduled at step 318. In certain embodiments, the job request is rescheduled if no end date is provided for the job and/or if an end date provided as part of the job descriptor has not expired. If at step 318, it is determined that the job does not require rescheduling, the method 300 ends.

Alternatively, if it is determined that the job needs to be rescheduled, the job scheduler updates the scheduled time for the job descriptor (depending on the selected periodicity). For example, if the periodicity is daily, the job scheduler 136 updates the scheduled time to the next day and re-queues the job descriptor at step 320.

The extracted metric data is stored in the electronic data table 142 based on the refresh type mentioned in the job descriptor (at step 318). If the refresh type is a period incremental type, the extracted data is appended to the data already existing in the table. If the refresh type is full refresh, the existing data in the electronic data table 142 is deleted and the new extracted data is added to the table. In order to do this, the MMS 130 communicates with the data store 140 (e.g., via the data store's APIs).

Thereafter, the process repeats from step 314 at the desired periodicity.

Alternatively, if at step 310, it is determined that the metric does not require periodic update, the method proceeds to step 322 where the query is applied to the database to extract the metric data and update the electronic data table 142 (step 324). Once the electronic data table is updated, the method 300 ends.

In this manner, aspects of the disclosed systems and methods can automatically create a metric, schedule recurring extraction of data, and create an electronic data table to store the metric data based on simple user inputs. The complexity of creating and managing the metrics is transferred to the central MMS 130. In the example above, the MMS 130 is utilized to create metrics based on events from single product platforms 120. In other embodiments, the MMS 130 can be utilized to create cross-platform metrics—e.g., to determine active users in a month across multiple product platforms. Further, the metrics jobs can be scheduled to extract data on a periodic basis indefinitely or an end date can be provided as part of the job request. Once the end date is reached, the scheduler 136 can delete the job request and method 300 can end.

Once the electronic data table for storing metric data is created, the MMS 130 may also be configured to automatically perform data quality checks on the electronic data table. One method for performing data quality checks on the electronic data tables is described in U.S. patent application Ser. No. 16/861,123 titled, "Quality control test transactions for shared databases of a collaboration tool", the entirety of which is incorporated herein by reference.

In addition to allowing users to create metrics, the MMS 130 also acts as a central store for maintaining metrics and providing a searchable metrics database. In particular, the metrics clients 112 can be used to perform searches in the metrics database 139 to search for one or more metrics. As described with reference to FIG. 4, the MMS 130 may display a list of metrics which the user can refine or filter based on multiple filtering/refining strategies. For example, the list of metrics can be refined to only show the metrics that are created by the user viewing the list or by a team that the user is a part of. Alternatively, the metrics can be refined based on tiers, label, keywords, etc.

Figure 6:
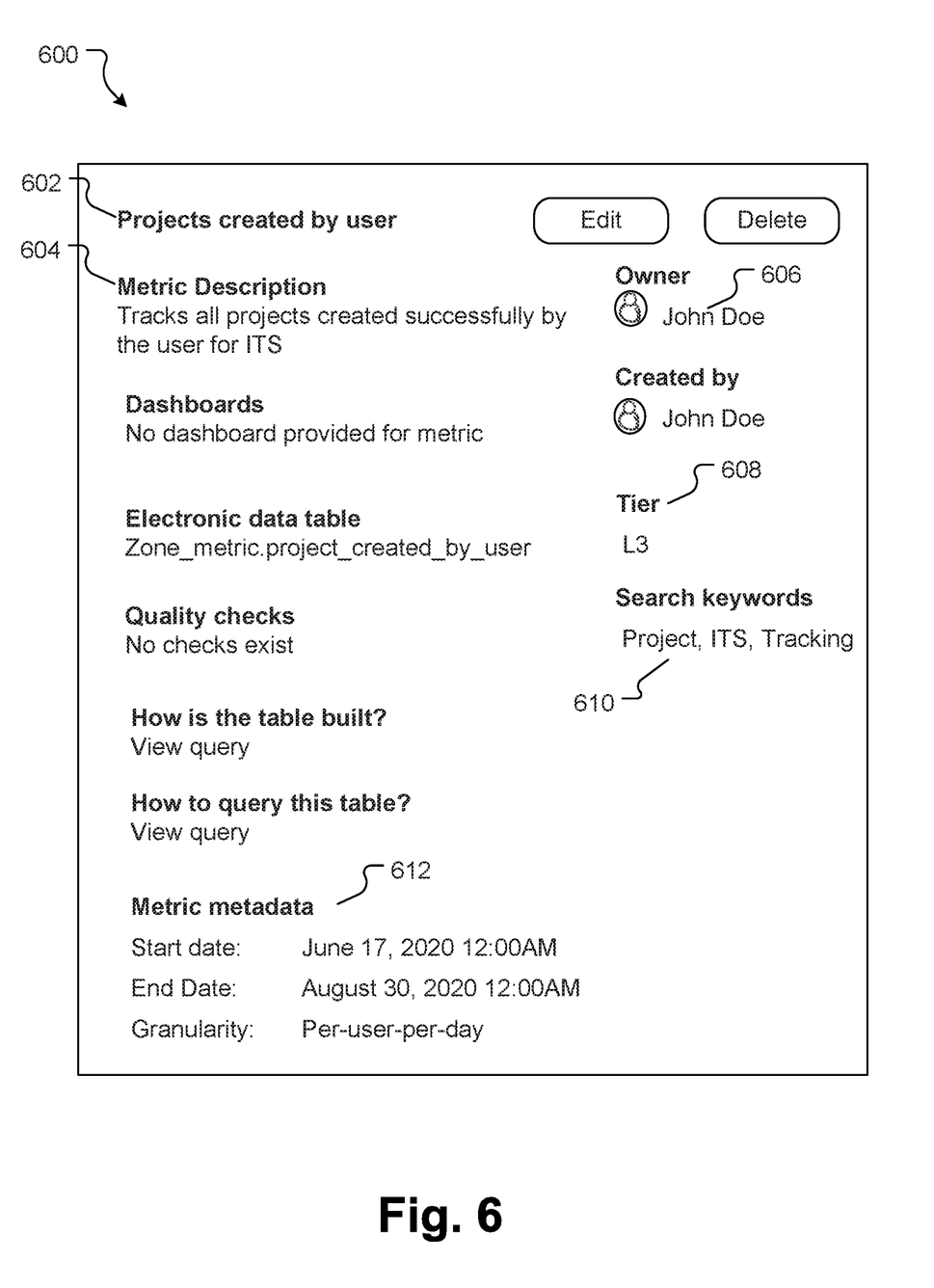
FIG. 6 is an example user interface showing a registered metric according to some aspects of the present disclosure.

Once the user identifies a metric the user is interested in, the user may select the metric for a deeper inspection. FIG. 6 illustrates an example user interface 600 displayed on a client device 110 upon selection of a particular metric. As seen in this example, the user interface 600 depicts the information stored for the selected metric in the metric database 139 including the metric name 504, description 506, owner 508, tier 602, search keywords 604, and metadata 606. In addition, the user interface displays links to the electronic data table where data for the metric is stored and any dashboards that are communicatively coupled to the electronic data table. In addition, the user interface 600 displays the query that can be used to retrieve data from the electronic data table. This query is automatically generated by the MMS 130 when the metric is registered and may be stored in the metric database along with other metric data.

Through this user interface 600, users (if they have the required permission) can also edit or delete a metric. Typically, if the user is the owner or belongs to the owner team, the user may have permission to edit (e.g., change the product platform, event type, or selected events for the metric) or delete the metric.

Finally, if data quality checks are configured on the electronic data table, the quality check status may also be displayed in the user interface 600.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A computer implemented method comprising:
    causing display of a graphical user interface on a client device, the graphical user interface depicting a list of items corresponding to existing metrics;
    in response to a selection of a selectable affordance of the graphical user interface, causing a display of a metric creation interface;
    receiving a metric request descriptor via the metric creation interface, the metric request descriptor including at least information for creating a metric query and an identifier of an electronic data table;
    in response to input provided via the metric creation interface, identifying a predefined metric template and automatically generating a custom metric query based on the information for creating the metric query and the predefined metric templates;
    creating the electronic data table based on the identifier of the electronic data table received in the metric request descriptor;
    applying the custom metric query to a data store storing a plurality of event records;
    extracting metric data from the data store based on the custom metric query; and
    storing the metric data in the electronic data table; and
    updating the list of items in the graphical user interface to include an item corresponding to the custom metric query.

2. The computer-implemented method of claim 1, wherein the metric request descriptor further includes a scheduling field indicating whether periodic extraction of the metric data is required and a corresponding periodicity.

3. The computer-implemented method of claim 2, further comprising:
    determining whether periodic extraction of the metric data is requested based on the scheduling field; and
    upon determining that periodic extraction of the metric data is requested, generating a job request for the metric request descriptor, the job request including the custom metric query and the periodicity; and
    scheduling the job request based on the periodicity; and
    executing a job at a scheduled time for extracting the metric data.

4. The computer-implemented method of claim 3, wherein the job request further includes a refresh identifier indicating whether the metric data is to replace any existing metric data in the electronic data table or whether the metric data is to be appended to the existing metric data in the electronic data table.

5. The computer-implemented method of claim 1, wherein the information for creating the metric query includes an event type identifier and a granularity field.

6. The computer-implemented method of claim 5, wherein the event type identifier comprises at least one of a screen event identifier, a user interface event identifier, a track event identifier, and an operational event identifier.

7. The computer-implemented method of claim 5, wherein the information for creating the metric query includes a product platform identifier.

8. The computer-implemented method of claim 5, wherein the information for creating the metric query includes identifiers of one or more events to be monitored.

9. The computer-implemented method of claim 1 further comprising performing a data quality check on the electronic data table.

10. The computer-implemented method of claim 1, further comprising communicatively coupling the electronic data table to a dashboard server, the dashboard server configured to generate one or more dashboards based on the metric data in the electronic data table and communicate the one or more dashboards to the client device for display on the client device.

11. A computer system comprising:
a processor; and
non-transitory computer readable medium storing sequences of instructions, which when executed by the processor, causes the processor to:
cause display of a graphical user interface on a client device, the graphical user interface depicting a list of items corresponding to existing metrics;
in response to a selection of a selectable affordance of the graphical user interface, cause a display of a metric creation interface;
receive a metric request descriptor via the metric creation interface, the metric request descriptor including at least information for creating a metric query and an identifier of an electronic data table;
in response to input provided via the metric creation interface, identify a predefined metric template and automatically generate a custom metric query based on the information for creating the metric query and the predefined metric templates;
create the electronic data table based on the identifier of the electronic data table received in the metric request descriptor;
apply the custom metric query to a data store storing a plurality of event records;
extract metric data from the data store based on the custom metric query; and
store the metric data in the electronic data table; and
updating the list of items in the graphical user interface to include an item corresponding to the custom metric query.

12. The computer system of claim 11, wherein the metric request descriptor further includes a scheduling field indicating whether periodic extraction of the metric data is required and a corresponding periodicity.

13. The computer system of claim 12, wherein the non-transitory computer readable medium further stores sequences of instructions, which when executed by the processor, causes the processor to:
determine whether periodic extraction of the metric data is requested based on the scheduling field; and
upon determining that periodic extraction of the metric data is requested, generate a job request for the metric request descriptor, the job request including the custom metric query and the periodicity; and
scheduling the job request for extracting the metric data based on the periodicity.

14. The computer system of claim 13, wherein the job request further includes a refresh identifier indicating whether the metric data is to replace any existing metric data in the electronic data table or whether the metric data is to be appended to the existing metric data in the electronic data table.

15. The computer system of claim 11, wherein the information for creating the metric query includes an event type identifier and a granularity field.

16. The computer system of claim 15, wherein the event type identifier comprises at least one of a screen event identifier, a user interface event identifier, a track event identifier, and an operational event identifier.

17. The computer system of claim 15, wherein the information for creating the metric query includes a product platform identifier.

18. The computer system of claim 15, wherein the information for creating the metric query includes identifiers of one or more events to be monitored.

19. The computer system of claim 11 wherein the non-transitory computer readable medium further stores sequences of instructions, which when executed by the processor, cause the processor to: perform a data quality check on the electronic data table.

20. The computer system of claim 11, wherein the non-transitory computer readable medium further stores sequences of instructions, which when executed by the processor, causes the processor to communicatively couple the electronic data table to a dashboard server, the dashboard server configured to generate one or more dashboards based on the metric data in the electronic data table and communicate the one or more dashboards to the client device for display on the client device.

* * * * *